United States Patent
Blane

[15] 3,704,421

[45] Nov. 28, 1972

[54] PULSE-TO-PULSE INSTANTANEOUS AUTOMATIC GAIN CONTROL CIRCUIT

[72] Inventor: Henry R. Blane, Charlottesville, Va.

[73] Assignee: Sperry Rand Corporation

[22] Filed: Dec. 31, 1970

[21] Appl. No.: 103,083

[52] U.S. Cl. ....................325/408, 325/411, 330/85

[51] Int. Cl. ..........................................H04b 1/16

[58] Field of Search ..............330/29, 85, 139; 343/5; 325/400, 408, 409, 410, 411

[56] References Cited

UNITED STATES PATENTS 2,532,347 12/1950 Stodola......................343/5 X

*Primary Examiner*—Robert L. Richardson
*Assistant Examiner*—Kenneth W. Weinstein
*Attorney*—S. C. Yeaton

[57] ABSTRACT

The output signal of an intermediate frequency amplifier is applied to a load through a video detector. An operational amplifier is arranged in a feedback loop so that the signal from the operational amplifier is used to control the gain of the intermediate frequency amplifier. A d.c. bias voltage is applied to the operational amplifier so that the gain control signal applied to the intermediate frequency amplifier represents the combination of the bias voltage and the instantaneous voltage from the video detector. The bias voltage is adjusted so that the intermediate frequency amplifier produces maximum gain so long as the voltage from the video detector remains below a specified value and reduced gain whenever the voltage from the detector exceeds the specified value.

5 Claims, 1 Drawing Figure

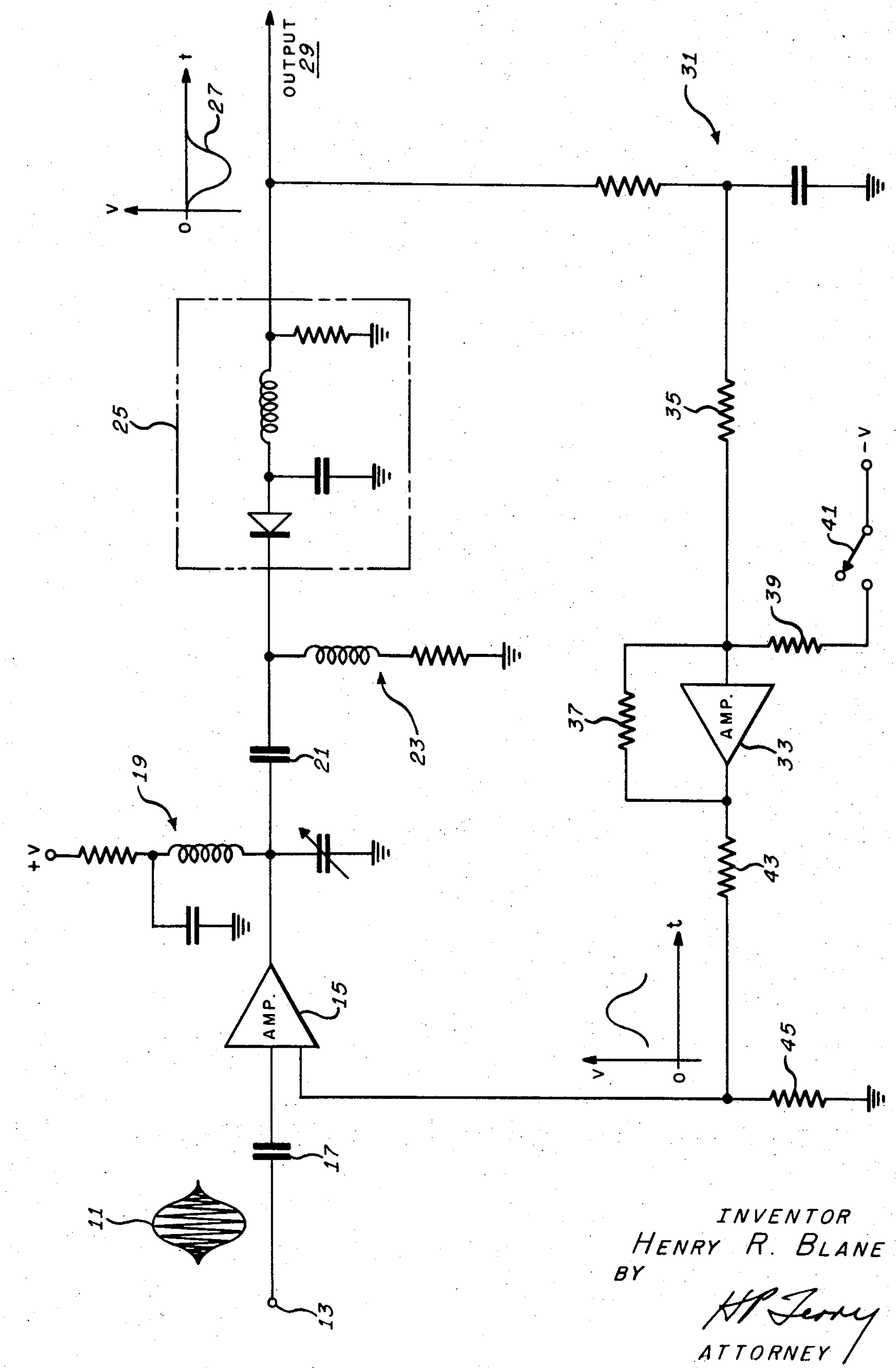
INVENTOR
HENRY R. BLANE
BY
HP Terry
ATTORNEY

PULSE-TO-PULSE INSTANTANEOUS AUTOMATIC GAIN CONTROL CIRCUIT

BACKGROUND OF THE INVENTION

1. Field of the Invention

This invention relates to automatic gain control circuits and more specifically to instantaneous automatic gain control circuits responsive to individual pulses in a pulse train.

2. Description of the Prior Art

Situations frequently arise wherein the amplitude of received radio frequency pulses is used to indicate an external condition. In radar receivers, for instance, the amplitude of the received pulse may be used to interpret the characteristic of the reflection medium. Instantaneous automatic gain control circuits are often used in such radar applications to normalize those radar return signals that would otherwise cause saturation. Typically, such saturation signals may be caused, for example, by large targets, clutter effects, or rain. The problem becomes particularly acute in applications such as airborne radars used for mapping purposes wherein a small river, for instance, behind large land mass would be obscured unless the land mass signal is reduced.

The gain control in such situations requires extremely fast normalization on a pulse-to-pulse basis. Prior art instantaneous automatic gain control circuits have a relatively slow response time and cannot respond to individual pulses.

The circuit of the present invention can provide response times in the order of 0.75 microseconds so that a weak signal target can be displayed with relatively the same intensity as a strong signal target.

SUMMARY OF THE INVENTION

The high input impedance and wide bandwidth characteristics of an operational amplifier are utilized in a feedback loop of a pulse responsive intermediate frequency amplifier stage to provide gain control signals operative on a pulse-to-pulse basis.

BRIEF DESCRIPTION OF THE DRAWING

The sole FIGURE is a schematic diagram illustrating a presently preferred form of the invention.

DESCRIPTION OF THE PREFERRED EMBODIMENT

Referring to the FIGURE, a received pulse of radio frequency energy 11 is applied to an input terminal 13 and coupled to an intermediate frequency amplifier 15 through a coupling capacitor 17. The output of the amplifier is applied to a filter network 19 that is tuned to the carrier frequency of the signal being received. The output signal is then passed through a coupling capacitor 21. A peaking circuit 23 may conveniently be utilized to improve the video response and to provide further discrimination against unwanted signals. The signal from the capacitor 21 is de-modulated in a video detector 25. The output of the video detector appears as a negative-going pulse 27 at an output terminal 29.

The output of the video detector is also applied through an R-C network 31 which serves to eliminate noise in the feedback circuit and to provide a slight delay which inhibits oscillations. The signal from the R-C network 31 is coupled to an operational amplifier 33 through a series resistor 35. A shunt resistor 37 connected between the input and output terminals of the operational amplifier 33 is proportioned with respect to resistor 35 so as to produce a desired degree of amplification of the feedback signals from the video detector.

The operational amplifier is also coupled to a suitable negative voltage source through a resistor 39 and a switch 41. The resistor 39 is proportioned with respect to resistor 37 so as to provide a suitable d.c. bias voltage as will be explained. The output of the operational amplifier 33 is coupled to the intermediate frequency amplifier through a resistor 43 and to ground through a resistor 45.

The output of the operational amplifier 33 consists of an inverted pulse corresponding in amplitude to the output pulse 27 and displaced from the zero axis by an amount equivalent to the d.c. bias voltage.

The intermediate frequency amplifier 15 is preferably a cascode amplifier having a differential configuration energized from a constant current source. One side of the differential is used to receive the input signal. The other side of the differential, which receives the feedback control signal, is used as a control element. Because of this differential arrangement, a wide range of gain control can be achieved.

The intermediate frequency amplifier is relatively insensitive to feedback voltages below a minimum level. For such small voltages, the effective gain of the amplifier remains substantially at a maximum level. When the feedback voltage level exceeds the minimum level, however, the amplifier gain quickly decreases in response to the instantaneous value of the feedback signal.

The output of the video detector is a negative-going pulse that represents the amplitude of the envelope of the received signal 11. The instantaneous automatic gain control circuit is actuated by closing the switch 41. This applies negative d.c. bias voltage through the resistor 39 into the operational amplifier 33. The bias voltage is inverted in the operation amplifier. The resistors 39 and 37 are selected so that the d.c. bias voltage produced at the output of the operational amplifier 33, plus the maximum amplitude of the feedback pulse that is to be tolerated without reducing the gain of the intermediate frequency amplifier 15, equals the aforementioned minimum value in the intermediate frequency amplifier 15.

As long as the pulse 27 remains equal to or less than a specified value, the amplifier 15 operates at maximum gain. As soon as the instantaneous amplitude of any portion of the feedback pulse exceeds the specified threshold, however, the gain of the amplifier 15 is reduced accordingly. Thus, the amplifier 15 responds instantaneously to the amplitude of the output pulse.

The instantaneous automatic gain control feedback loop of the present invention responds extremely fast because the bandwidth of the operational amplifier is very wide and because the video pulse is not required to supply a significant amount of energy.

Because the feedback circuit of the present invention can respond on a pulse-to-pulse basis, strong return signals can be prevented from masking weak return signals.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. An instantaneous automatic gain control circuit comprising an intermediate frequency amplifier, first means in said intermediate frequency amplifier for receiving an input signal, second means in said intermediate frequency amplifier for controlling the gain thereof in response to a control signal, detection means for extracting the modulation envelope of input signals applied to said intermediate frequency amplifier, an operational amplifier connected in feedback relationship so as to provide a control signal to said second means in response to a signal from said detection means, means to bias said operational amplifier to a d.c. level so that the instantaneous value of the control signal applied to said second means is equivalent to the sum of the bias and the amplitude of the signal from said detection means at that instant, said bias means being adjusted so that the signal from said operational amplifier will reduce the gain of said intermediate frequency amplifier whenever the amplitude of the signal from said detection means exceeds a predetermined level, and output means for coupling the output of said detection means to external utilization apparatus.

2. The circuit of claim 1 wherein the input signals to be received are amplitude modulated pulses of relatively short duration, wherein said detection means produces corresponding pulses of a given polarity, said polarity being the same as the polarity of the bias applied to said operational amplifier, and wherein said operational amplifier has a sufficiently short response time so that said control signal pulse occurs entirely during the reception of the corresponding amplitude modulated pulse.

3. The circuit of claim 2 wherein said second means in the intermediate frequency amplifier is characterized in that the amplifier provides maximum gain whenever the applied control signal is below a given minimum level and reduced gain whenever the applied control signal exceeds the minimum level.

4. The circuit of claim 3 wherein the intermediate frequency amplifier is a cascade amplifier connected in differential configuration and arranged so that the signal to be amplified is representative of the difference between the instantaneous voltages applied to said first and second means.

5. The circuit of claim 4 further including first resistance means for resistively coupling signals from said detection means to said operational amplifier, and second resistance means shunting said operational amplifier, said first and second resistance means being proportioned to provide the desired operational amplifier gain, said circuit further including a third resistance means and a switch for optionally connecting said operational amplifier to a bias source, said second and third resistance means being proportioned to provide the desired d.c. level for the control voltage, said circuit still further including a pair of resistors connected serially across the output of said operational amplifier, the junction point between said pair of resistors being connected directly to said second means in said intermediate frequency amplifier.

* * * * *